June 5, 1928.
O. U. ZERK
TRIPOD
Filed Sept. 9, 1925
1,672,596
2 Sheets-Sheet 1
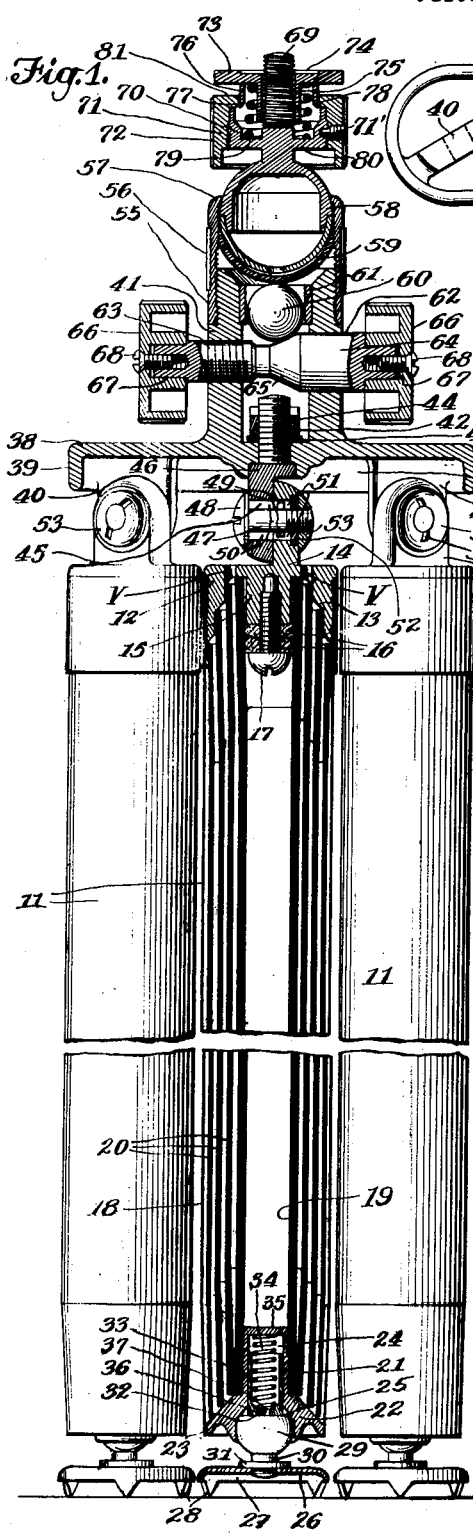
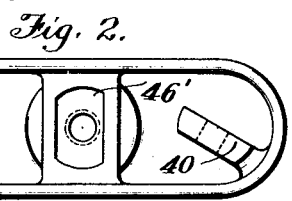
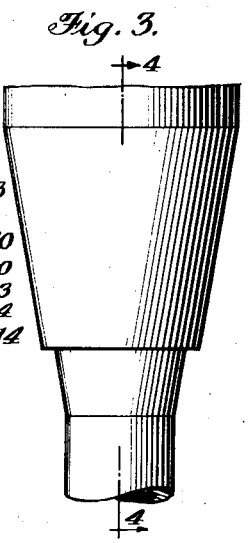
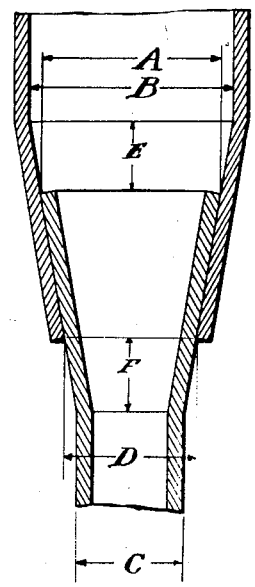
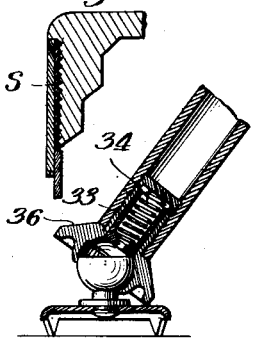
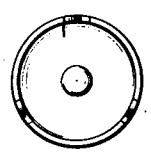
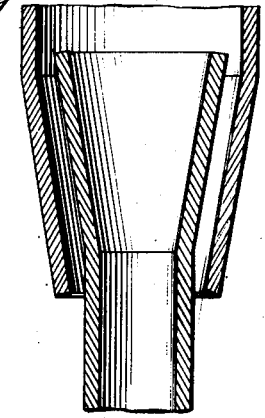
Inventor
Oscar U. Zerk.
By Pierce & Sweet
Attys.

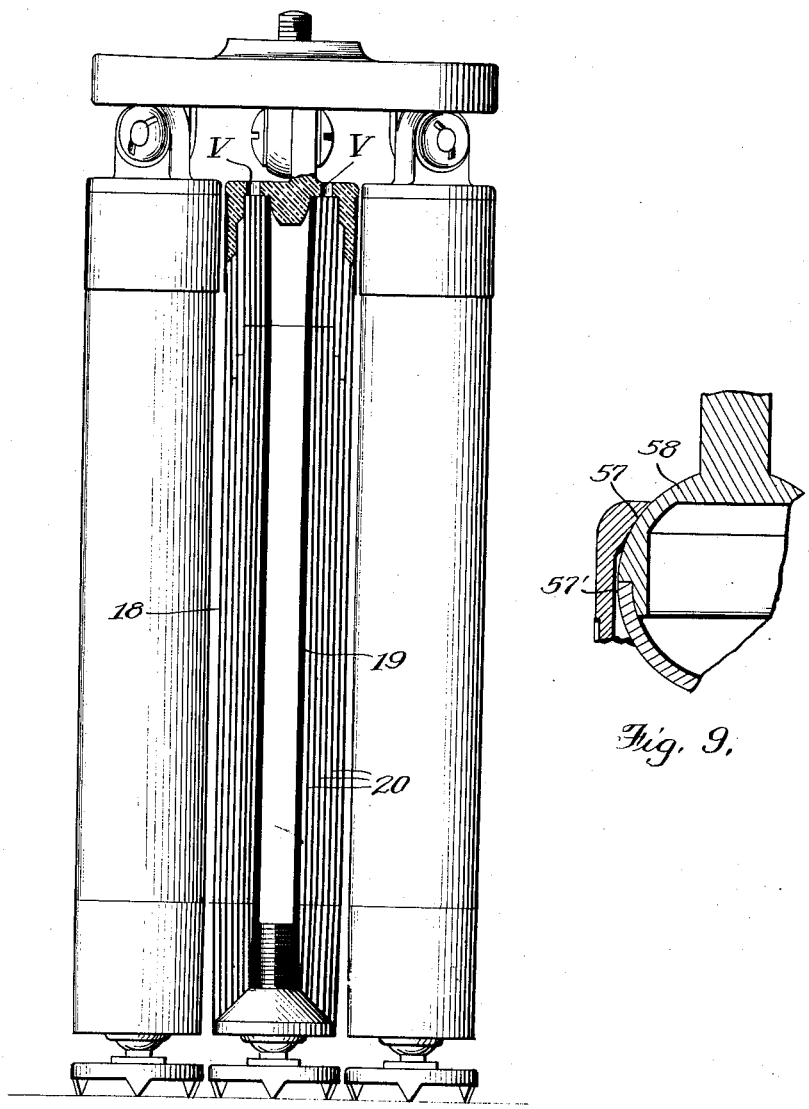

Patented June 5, 1928.

1,672,596

UNITED STATES PATENT OFFICE.

OSCAR U. ZERK, OF CHICAGO, ILLINOIS.

TRIPOD.

Application filed September 9, 1925. Serial No. 55,350.

My invention relates to improvements in tripods, and is particularly concerned with tripods designed for supporting cameras, motion picture cameras, surveying instruments, range finders, and so forth. The advent of amateur motion picture photography and especially telephoto motion picture photography, and also the motion picture photography of panoramic views, as well as the growing popularity of telephoto still photography and the use of light filters in photography for producing pictures in natural colors, and so forth, make it imperative to use in combination with the various cameras required for these purposes a tripod of the utmost degree of rigidity under the most adverse conditions. Such a tripod must also be of a type that can be quickly expanded and collapsed, and should preferably be a metal tripod.

In addition, the conditions under which such tripods operate make it necessary to provide a tripod in which the wear and tear of all moving parts is automatically and immediately compensated or taken up. This ability to compensate for wear and tear and to eliminate all lost motion must extend not only to the joints of the tripod legs, but also to the moving parts of the tripod head and to the feet of the tripod.

The objects of my present invention are:

First, to provide a collapsible tripod that is exceedingly rigid throughout all its parts when the sections forming the legs are in their extended position, so that it will not swerve or vibrate under the action of the load and wind, or handling of the camera;

Second, to provide a tripod such as described in which all the leg sections can be easily and quickly exchanged in case they are damaged by accident;

Third, to provide a tripod that can be easily and quickly extended and collapsed;

Fourth, to provide a tripod in which the several sections of pipe or tubing forming each of the legs are retained in their extended position only by frictional contact with each other;

Fifth, to provide a tripod which, when in its collapsed condition, occupies a minimum amount of space;

Sixth, to provide a tripod such as described, in which the several sections of pipe forming each of the legs are provided with conical, frictional surfaces so arranged that when the sections of any one pipe are released by an initial movement and merely permitted to drop to their extended position, sufficient friction is developed between the contact surfaces to enable the tripod to support quite large loads;

Seventh, to provide a tripod such as described having a maximum ratio between its extended and its collapsed lengths; and Finally, to provide a tripod such as described that is comparatively simple in construction, economical to manufacture, and easy to operate.

Other objects of my invention will appear as this description progresses, reference being had to the accompanying drawings, in which Figure 1 is a side elevation, partially in central longitudinal section, showing the details of construction of my improved tripod;

Figure 2 is a bottom view of the head of the tripod;

Figure 3 is an exaggerated elevational detail on an enlarged scale of one of the joints formed by two telescoping sections of one of the legs of the tripod;

Figure 4 is a longitudinal section through Figure 3 on line 4—4;

Figure 5 is a view similar to Figure 4, but showing the two conical frictional surfaces separated from each other;

Figure 6 is a sectional detail showing certain details of construction of the bottom portion of one of the legs;

Figure 7 is a bottom view of the foot shown in Figure 6;

Figure 8 is a sectional detail showing the means employed for detachably connecting the upper end of the outer section of each leg with the corresponding header, this section being on an enlarged scale; and Figure 9 is an enlarged sectional detail of a portion of the construction shown in Figure 1; and Figure 10 shows a modified form of my invention.

Throughout the several figures of the drawings, similar reference characters are used for referring to the same parts, and the several sections are taken looking in the direction of the small arrows.

Referring to the drawings, my improved tripod comprises a head that is referred to as a whole by reference character 10, the details of which will later be referred to, and three legs 11 that are pivotally connected with the head 10 by means that also will be referred to later on. Each of these legs comprises a header 12 having a stepped bore, the portions of which are joined by tapered shoulders 13, for a purpose that will later be referred to. A hinge lug 14 extends from the upper end of each header, and the boss 15 extends inwardly in spaced relation to the walls of the bore of the header. One or more friction discs 16 are secured to the end of the boss 15 by means of a screw 17. These friction discs may be of leather, or other suitable material, and constitute means for holding the several sections of the leg in collapsed relation, as will later be described.

Each leg consists of an outer pipe section 18, an inner pipe section 19, and intermediate pipe sections 20. The upper ends of all of the pipe sections, with the exception of the outer pipe section 18, are swedged or tapered outwardly, as shown in Figure 1, and the lower ends of all of the pipe sections, with the exception of the inner one, are swedged inwardly, as shown in the same figure. As shown in this figure the walls of the sections vary in thickness, the inner sections being thicker than the outer sections, to obtain a uniformly rigid leg when the sections are in extended position.

The outer surface of the upper ends of the pipe sections are tapered to the same degree as the inner surfaces of the lower ends of the pipe sections, so that when the outer frictional surfaces of the upper ends of the sections are brought into contact with the inner frictional surfaces of the lower ends of the next outer sections, respectively, they will be firmly held together by frictional contact. It is important to use a very small taper and a long bearing surface. I have found that an angle to the axis of the section of three-fourths of a degree and a bearing surface of about one inch in length, produces excellent results.

The diameters A and C of the larger and smaller ends of the conical frictional surface at the upper end of each of the pipe sections are smaller than the corresponding diameters B and D of the upper and lower ends of the internal frictional surfaces at the lower ends of each of the pipe sections. With the construction described, when the sections are in their expanded condition the portions E and F of the upper and lower contacting surfaces will be uncovered, see Figure 4. This construction assures the free sliding of each pipe section within the next larger pipe section, so that the several pipe sections, after having been initially released, as will later be described, are free to move to their extended positions under their own weight when the tripod is held in a vertical position, and the weight of the several sections is sufficient to bring the co-acting frictional contact surfaces into firm contact so that, ordinarily, no further manipulation of the sections of the several legs is necessary to produce a secure support. In order to relieve the vacuum that might otherwise be produced while the sections are moving to their extended positions, I provide one or more vent openings V in the upper header of each leg. There should be a sufficient number of these openings to permit air to enter the sections at a rate that will not interfere with the rapid movement of the several sections. Furthermore, this construction is of importance in collapsing the sections forming the several legs, because all that is necessary is to break the contact between the frictional surfaces, and the several sections will then slide to their collapsed position by merely inverting the tripod.

The upper end of each outer pipe section is threaded onto the corresponding header, and a foot is threaded onto the lower end of the inner section of each leg, as shown on an enlarged scale in Figure 8, and in Figures 1 and 6, respectively, so that the header and foot can be removed from each leg for the purpose of quickly and easily withdrawing and replacing any pipe section that may become damaged. This is of very considerable importance because tripods of this character are usually subjected to more or less severe usage, during which they may become dented or otherwise injured to such an extent that their replacement becomes necessary. With the ordinary type of tripod leg, it is impossible to do this without taking the entire tripod leg apart, which requires the expenditure of very considerable time and labor. With my construction, it is necessary merely to unscrew the outer pipe section from the header, and the inner pipe section from the foot or the header of the foot, whereupon all of the sections drop apart. Since the outer section is comparatively thin, I prefer to reinforce the threaded portion thereof by means of a sleeve S that may be sweated or otherwise secured to the outside of the threaded portion of this section.

The lower end of the inner pipe section is provided with a header that comprises a hollow cylindrical portion 21 that is threaded into the lower end of the inner section, and an outer enlarged portion 22 having a circular flange 23. A cylindrical bore 24 in the cylindrical portion 21 communicates with a spherical socket 25 formed in the outer end of the header. The foot of each leg is formed of a disc-like stamping 26 having a downturned flange 27 that is cut away at intervals to provide a plurality of toes 28, preferably three in number, although more or less may be used. This foot is connected with the header at the lower end of the inner section by means of the ball 29 that is movable in the socket 25, and which has a downwardly extending projection 30, which is riveted to the disc 26. The disc is held from moving upwardly by means of the shoulder 31 formed integrally with the projection 30. The inner side of the ball 29 is flattened, as shown at 32, to provide means for holding the foot in the position shown in Figure 1, when the tripod is not in use. This is accomplished by means of a hollow plunger 33 that slides in the cylindrical bore 24, and is yieldingly held against the flattened side of the ball 29 by means of the spring 34 confined between the inner end 35 of the header and the end 36 of the plunger. This end of the plunger is provided with an opening 37 that establishes communication between the bore 24 and that portion of the socket that is not occupied by the ball and the end of the plunger. This space is preferably filled with a viscous, but not a solid, lubricant that will lubricate the contacting surfaces of the ball and socket, and at the same time exclude moisture and dirt from the mechanism just described.

From the above description, it will be clear that when the foot of any leg of the tripod is moved to any position, in which the axis of the projection 30 is not parallel with the axis of the inner section, such for instance as the position shown in Figure 6, one edge of the plunger 33 will contact with one edge of the flattened side of the ball at an eccentric point, and that the pressure of the spring 34 will tend to return the parts to the position shown in Figure 1, so that immediately the foot is removed from the ground or other supporting surface, the plunger 33 will move outwardly and restore the foot and the corresponding parts to the position shown in Figure 1.

The outer portion of the lower header is provided with a conical surface 36 which, when the parts are moved to the position shown in Figure 1, acts as a spreader and centering device for the lower ends of the pipe sections, so as to hold them securely in separated position, and thus prevent rattling of the several sections. When the sections of the legs are collapsed to the position shown in Figure 1, the inner conical surface of the inner section makes frictional contact with the peripheries of the friction discs 16, and at the same time the beveled surface 36 of the lower header holds the intermediate sections in the position shown, so that all of the sections are firmly held in their collapsed positions.

From an inspection of Figure 1, it will be noted that each pipe section is formed of metal tubing having a somewhat greater thickness than the next outer pipe section. This is to compensate for the loss in rigidity of the pipe sections themselves that would otherwise be due to their decreasing diameters. This helps to make the leg construction exceedingly rigid.

The head of my improved tripod, which is preferably made of an aluminum die-casting, comprises an elongated plate 38 having the down-turned flange 39 and integrally formed hinge lugs 40. It also comprises the hollow cylindrical boss 41. An opening is formed centrally of the plate 38 for receiving the bolt 42 that is held in place by means of the lock washer 43 and the nut 44, this nut preferably being slotted at its upper end, as shown at 45, to enable it to be tightened or loosened by means of a special tool. The head 46 of this bolt is conformed similarly to the depression 46' formed in the lower side of the plate 38, so that when the parts are assembled in the position shown in Figure 1, this bolt cannot rotate with respect to the plate 38. The lower end of the head 46 of this bolt forms a hinge lug for coacting with the hinge lug 14 on the corresponding header 12, and these two hinge lugs are pivotally connected by means of a bolt 47 having the head 48, and from the opposite sides of which project two lugs 49 that may either be integrally formed with the bolt, or consist merely of the ends of a pin passing through the bolt. Both hinge lugs are provided with openings of substantially the same diameter as the bolt 47, but oppositely disposed grooves 50 and 51, respectively, are formed in the lugs. The grooves 50 in the hinge lug formed by the head 46 are required to permit the lugs 49 to be positioned in the slots of the hinge lug 14, as shown in Figure 1. A spring or lock washer 52 and a nut 53 complete the means for clamping the two hinge lugs together in such position that while they can pivot freely upon each other, there will be no lateral lost motion between the two hinge lugs. This construction permits each of the legs to be moved to any desired position within the limits of its adjustability, but entirely prevents any undesired movement between the head of the tripod and the legs.

From the construction just described, it will be apparent that when any one of the legs is moved relatively to the head, the sides of the groove in the hinge lug 14 will engage the lugs 49 and cause the bolt 47 to turn with the leg, thereby preventing relative movement between the bolt 47 and the nut 53, and thus preventing the latter from, in time, working loose. The nuts 53 are provided with slots 54 for a spanner wrench or screw driver by which they can be tightened or loosened.

A sleeve 55 is threaded onto the upper end of the hollow boss 41 and projects upwardly therefrom. The outer surface of the sleeve is knurled, as indicated at 56, and the upper end thereof is flanged inwardly, as shown at 57, see Figures 1 and 9, to provide a seat slightly smaller in diameter than the external diameter of the ball. The bore of the sleeve below this seat is enlarged to provide the clearance recess 57' which prevents the wedging of the ball upon the seat 57. This ball is preferably hollow in construction, and to make it easy to produce such a hollow ball, I prefer to make it in two parts, as shown in Figure 1. These two parts may be pressed together or soldered, or secured together in any other desired manner.

For holding the ball in any of its adjusted positions, I provide a bowl-shaped follower 59. The curvature of the inner portion of this follower has a slightly smaller diameter than the external curvature of the ball 58, so that the contact between the ball and the bowl is adjacent the edge of the latter only. This insures adequate frictional contact between the ball and the follower to hold it in any of its adjusted positions.

For urging the follower into contact with the ball 58, I provide a second ball 60 that can slide in a sleeve 61, preferably of hardened steel, which is inserted in the hollow boss 41. The screw 62 comprises two portions 63 and 64 of different diameters that are joined by the conical surface 65. This screw extends through the walls of the boss 41, and the smaller portion 63 thereof has screw threaded engagement with one wall of the boss 41 in such manner that when the screw is rotated, the conical surface 65 will press the ball 60 upwardly against the bowl 59, and cause the latter to be held in frictional engagement with the hollow ball 58. To enable the operator easily to rotate the screw 62, I prefer to provide each end thereof with a knurled knob 66. This enables the operator to use the knobs singly when the camera is tilted to a position rendering one of the knobs inaccessible, or both together when conditions permit. In the latter case, it is easier for the operator to make use of both knobs to operate the screw than to make use of simply one of them. These knobs are provided on their inner sides with recesses 67 for receiving the outer ends of the screw 62, two sides of each recess preferably being flattened (not shown) to engage with the correspondingly flattened portions of the corresponding end of the screw 62. Small screws 68 may be used for securing the knobs to the ends of the screw.

The axis of the screw 62 is preferably parallel with the long dimension of the plate 38, and the diameters of the knobs 66 are preferably substantially equal to the width of the plate 38. This not only provides a very compact construction, but also positions the knobs where they are protected from injury by the plate 38, and where they conform with the flat construction of my tripod.

A screw 69 extends outwardly from the ball 58 and is properly threaded to make connection with the threaded socket usually provided in a camera for this purpose. Formed integrally with this screw is an annular flange 70 onto which is threaded the sleeve 71, the exterior of which is knurled as shown at 72. A set screw 71' may be used for locking the sleeve 71 to the flange 70. Both the flange 70 and the sleeve 71 are spaced from the screw 69. A contact disc or plate 73, that is recessed at 74, has an inwardly extending cylindrical boss 75 that more or less closely surrounds the screw 69 and slides thereupon, and has also an outer cylindrical boss 76 that is turned outwardly at its outer end, as shown at 77, to engage with the beveled surface 78 of the sleeve 72. A strong compression spring 79, confined between the web 80 that connects the flange 70 with the screw 69 and the contact plate 73, forms with the web 80 and the contact plate 73 a friction clutch for holding the contact plate in its adjusted positions.

To secure a camera to the tripod just described, the operator, preferably, first releases the ball 58 by turning the screw 62 to such a position that the friction between the bowl 59 and the ball 58 becomes negligible. By then grasping the knurled surface of the sleeve 71, the operator can start threading the screw 69 into the correspondingly threaded socket of the camera, without moving the camera or tripod. Continued threading of the screw 69 into the socket brings the contact disc 73 into contact with the bed plate or other portion of the camera surrounding the socket, and further turning of the sleeve 71 results, first, in placing the spring 79 under increased tension, and, lastly in locking the flat end surface 81 of the sleeve 71 against the inner face of the contact disc 73, so that the camera is then securely locked to the screw 69. The operator can then position the camera as desired, and, by turning the screw 62 in the proper direction, lock the camera in this position.

It will be noted that in securing the camera to the tripod, as described, there are three different stages: first, that in which the camera is partially threaded onto the screw 69, but not yet in contact with the contact disc 73; second, that position in which the camera is in contact with the disc 73, and, lastly, that position in which the contact disc 73 is locked to the sleeve 71. The first position enables the operator easily to start the screw 69 into the threaded socket of the camera. The second position described may be useful in taking panoramic pictures in which the camera is rotated about a vertical or other axis, and to provide means that will permit the camera to be easily and quickly adjusted to different angular positions and held in the adjusted positions by frictional contact. It should also be noted that as soon as the contact plate 73 contacts with the bed plate or other portion of the camera, it ceases to rotate because the friction between the plate 73 and the camera is greater than the friction between the spring 79 and the contact plate 73 or web 80. Scratching or marring of the surface of the camera as occurs in securing the usual type of tripod to a camera due to the rubbing of the contact disc upon the outer surface of the camera is thereby prevented.

From an inspection of Figures 1 and 2, it will be noted that the hinge lugs 40 and the hinge lug formed by the head of the bolt 46 are in substantial alinement, so that the head of the tripod assumes an elongated form, and so that the legs thereof may be folded into a common plane. This provides a compact construction when collapsed, and is exceedingly rigid when in use.

In the construction shown in Figure 1, the pipe sections are shown as gradually increasing in thickness from the outer to the inner sections. This is of particular advantage where the pipe sections are made of aluminum or aluminum alloy. In the construction shown in Figure 10, I have shown the pipe sections 18, 19 and 20 all of the same thickness. This is advantageous because it makes a slightly more compact construction, but it requires pipe sections of considerable more hardness and rigidity than the construction shown in Figure 1. In a construction of this kind, I, therefore, make use of steel tubing, preferably hardened by cyanide or other treatment, otherwise the construction shown in Figure 10 is the same as that shown in Figure 1.

While I have described in more or less detail the construction of the head, the feet and the hinge connection between the head and the legs, of my improved tripod, the claims of this application are directed more or less specifically to the construction of the legs themselves and those portions of the remaining elements that may enter into combination with this particular leg construction, and the remaining features of my improved tripod are described more in detail and claimed in my co-pending applications B, C and D, filed of even date herewith.

While I have described the details of construction of the preferred embodiment of my invention, it is to be clearly understood that my present invention is not limited to these details, but is capable of other adaptations and modifications within the scope of the appended claims.

Having thus described my invention, what I claim is:

1. In a tripod, an extensible leg structure comprising telescopic sections, each section having a substantially cylindrical portion, the upper and lower section each having a tapering portion at least at one end and the intermediate sections having tapering portions at both ends, the largest part of the upper tapered portion of each section being smaller than the internal diameter of the cylindrical portion of the next adjacent section above, the smallest portion of the lower tapering portion of each section having a greater internal diameter than the external diameter of the cylindrical portion of its adjacent lower section, whereby said sections may fall freely relative to one another to form rigid wedging connections between their tapered portions solely by the force of gravitational impact.

2. In a tripod, an extensible telescopic leg structure comprising a plurality of sections, each section having a substantially straight tubular portion, a flared portion at the upper end of the innermost section, an inwardly tapered portion at the lower end of the outermost section, outwardly flared portions at the upper ends and inwardly tapered portions at the lower ends of the intermediate sections, the least internal dimention of the inwardly tapered portion of each section being greater than the greatest external dimension of the straight tubular portion of the next adjacent inner section, and the greatest external dimension of the flared portion of each section being less than the least internal dimension of the straight tubular portion of the next adjacent outer section, whereby said sections may fall freely relative to one another.

3. An extensible supporting member comprising a plurality of telescoping sections having substantially cylindrical portions and cooperating, wedging terminal surfaces adapted to form rigid connections to hold the supporting member in extended position, the internal diameter of the cylindrical portion of one section being greater than the greatest external diameter of the next adjacent inner section whereby there is sufficient clearance between said sections to permit them to fall freely relative to one another without appreciable friction so that said connections may be formed solely by the impact of gravitational momentum.

4. An extensible supporting member comprising a plurality of telescoping sections having substantially cylindrical portions and cooperating, wedging terminal surfaces adapted to form rigid connections to hold the supporting member in extended position, the internal diameter of the cylindrical portion of one section being greater than the greatest external diameter of the next adjacent inner section whereby there is sufficient clearance between said sections to permit them to fall freely relative to one another without appreciable friction so that said connections may be formed solely by the impact of gravitational momentum, and the inner sections being of progressively greater wall thickness than the outer sections.

In witness whereof, I hereunto subscribe my name this 5th day of September, 1925.

OSCAR U. ZERK.